UNITED STATES PATENT OFFICE.

MAX ENGELMANN AND BENEDIKT MERKEL, OF ELBERFELD, GERMANY, ASSIGNORS TO SYNTHETIC PATENTS CO., INC., OF NEW YORK, N. Y., A CORPORATION OF NEW YORK.

DISINFECTING AGENTS.

1,167,642.  Specification of Letters Patent.  Patented Jan. 11, 1916.

No Drawing.  Application filed November 5, 1914. Serial No. 870,498.

*To all whom it may concern:*

Be it known that we, MAX ENGELMANN and BENEDIKT MERKEL, doctors of philosophy, chemists, citizens of the German Empire, residing at Elberfeld, Germany, have invented new and useful Improvements in Disinfecting Agents, of which the following is a specification.

The mercurized phenols and acids which have proved to be valuable disinfecting agents easily dissolve in dilute alkalis. The alkali salts however cannot be isolated in a solid state from such solutions without undergoing decomposition.

We have now found that easily soluble and very valuable disinfecting products can be obtained in a solid state by mixing mercurized phenols or acids with caustic alkalis. Indifferent compounds e. g. salts can also be added to these mixtures.

The new products are stable mixtures which can be handled and transported without danger of undergoing decomposition, and have the advantage that they can be readily dissolved in water. The caustic alkali present acts not only as a solublizing agent but when seed corn is to be disinfected, it also serves to neutralize the small quantities of acids that are usually present in the corn.

The new preparations are whitish to yellowish powders soluble in water; insoluble in alcohol and ether; giving with hot ammonium sulfid a black precipitate of $Hg_2S$. By heating them with concentrated hydrochloric acid they are split up into $HgCl_2$ and a phenol or an aromatic acid.

The new preparations have proved to be valuable disinfecting agents especially for disinfecting seed-corn.

In order to illustrate the new process more fully the following example is given, the parts being by weight:—10 parts of mercurichlorophenolsulfate having most probably the formula:

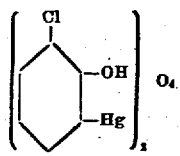

and 5 parts of caustic soda are ground together. The powder thus obtained is stable and clearly soluble in water. Other mercurized products can be used; e. g. mercuriphenolacetate:

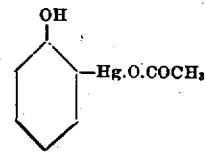

mercurized para-nitrophenol:

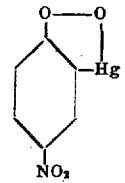

mercuribenzoic acid:

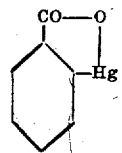

mercurichlorobenzoic acid:

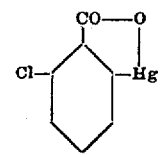

etc.

It is advantageous to employ an excess of caustic alkali because in many cases, e. g. for disinfecting seed-corn small quantities of acids being present on the corn take away some alkali. To diminish the poisonousness of the product and to obtain a product of a precise percentage of mercury salts e. g. sodium sulfate can be added. Concentrated lyes of caustic soda can be used and the resulting mixture dried.

We claim:—

1. The herein described new disinfecting preparation containing an organic mercury compound and an alkaline substance, said products being a whitish to yellowish powder soluble in water; insoluble in alcohol and ether; giving with hot ammonium sulfid a black precipitate of $Hg_2S$; being split up into $HgCl_2$ and a phenol or an aromatic acid by heating it with concentrated hydrochloric acid, substantially as described.

2. The herein described new disinfecting preparation comprising an organic mercury compound and a caustic alkali, said preparation being a whitish to yellowish powder soluble in water; insoluble in alcohol and ether; giving with hot ammonium sulfid a black precipitate of $Hg_2S$; being split up into $HgCl_2$ and a phenol or an aromatic acid by heating it with concentrated hydrochloric acid, substantially as described.

3. The herein described new disinfecting preparation comprising mercurichlorophenol and an alkaline substance, said preparation being a whitish stable powder clearly soluble in water, insoluble in alcohol and ether; giving with hot ammonium sulfid a black precipitate of $Hg_2S$; being split up into $HgCl_2$ and chlorophenol by heating it with concentrated hydrochloric acid, substantially as described.

4. The herein described new disinfecting preparation comprising mercurichlorophenol and caustic soda, said preparation being a whitish stable powder clearly soluble in water, substantially as described.

In testimony whereof we have hereunto set our hands in the presence of two subscribing witnesses.

MAX ENGELMANN. [L. S.]
BENEDIKT MERKEL. [L. S.]

Witnesses:
 HELEN NUFER,
 ALBERT NUFER.

It is hereby certified that in Letters Patent No. 1,167,642, granted January 11, 1916, upon the application of Max Engelmann and Benedikt Merkel, of Elberfeld, Germany, for an improvement in "Disinfecting Agents," an error appears in the printed specification requiring correction as follows: Page 1, lines 46–51, formula, for the symbol "$O_4$," read $SO_4$; and that the said Letters Patent should be read with this correction therein that the same may conform to the record of the case in the Patent Office.

Signed and sealed this 1st day of February, A. D., 1916.

[SEAL.]

J. T. NEWTON,

*Acting Commissioner of Patents.*

Cl. 167–3